(12) United States Patent
Kim (10) Patent No.: US 9,412,983 B2
(45) Date of Patent: Aug. 9, 2016

(54) BATTERY PACK

(75) Inventor: Myung-Chul Kim, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 664 days.

(21) Appl. No.: 13/596,315

(22) Filed: Aug. 28, 2012

(65) Prior Publication Data

US 2013/0252058 A1 Sep. 26, 2013

(30) Foreign Application Priority Data

Mar. 23, 2012 (KR) ........................ 10-2012-0029859

(51) Int. Cl.
*H01M 2/10* (2006.01)
*H01M 2/02* (2006.01)

(52) U.S. Cl.
CPC ................................. *H01M 2/1077* (2013.01)

(58) Field of Classification Search
CPC ............ H01M 2/00; H01M 2/02; H01M 2/04
See application file for complete search history.

(56) References Cited

U.S. PATENT DOCUMENTS

| 6,653,008 B1 * | 11/2003 | Hirakata et al. | 429/434 |
| 7,470,895 B1 * | 12/2008 | Cramer et al. | 250/239 |
| 7,989,102 B2 | 8/2011 | Fukusako et al. | |
| 2006/0178708 A1 * | 8/2006 | Rorvick et al. | 607/36 |
| 2009/0130530 A1 * | 5/2009 | Tanaka | 429/34 |
| 2009/0286129 A1 * | 11/2009 | Niimi | 429/34 |
| 2010/0273040 A1 * | 10/2010 | Kubota et al. | 429/100 |
| 2011/0143179 A1 | 6/2011 | Nakamori | |
| 2011/0143193 A1 * | 6/2011 | Ahn | 429/176 |
| 2012/0164500 A1 * | 6/2012 | Loo et al. | 429/82 |
| 2013/0052515 A1 * | 2/2013 | Park | H01M 2/1077 429/159 |

FOREIGN PATENT DOCUMENTS

| JP | 2011-146288 | 7/2011 |
| KR | 10-2004-0109032 | 12/2004 |
| KR | 10-2009-0000307 A | 1/2009 |
| KR | 10-2011-0066088 | 6/2011 |
| WO | WO 2011086771 A1 * | 7/2011 |

OTHER PUBLICATIONS

Korean Office Action dated Feb. 1, 2006.

* cited by examiner

*Primary Examiner* — Carlos Barcena
(74) *Attorney, Agent, or Firm* — Lee & Morse, P.C.

(57) ABSTRACT

A battery pack includes a battery module including a plurality of battery cells that are electrically connected, a first case accommodating the battery module, and a second case opposite to the first case so as to be coupled to the first case. The first or second case includes an extending portion, the extending portion being provided to extend in a first direction, the first direction being a direction in which the first and second cases are coupled to each other, so as to shield a portion at which the first and second cases are coupled to each other.

12 Claims, 6 Drawing Sheets

BATTERY PACK

BACKGROUND

1. Field

Embodiments relate to a battery module, and more particularly, to a battery pack having a shielding effect.

2. Description of the Related Art

A high-power battery module using a non-aqueous electrolyte with high energy density has recently been developed. The high-power battery module may be configured as a large-capacity battery pack by connecting a plurality of battery cells in series so as to be used in driving motors of devices requiring high power, e.g., electric vehicles and the like.

SUMMARY

Embodiments are directed to a battery pack, including a battery module including a plurality of battery cells that are electrically connected, a first case accommodating the battery module, and a second case opposite to the first case so as to be coupled to the first case. The first case or the second case may include an extending portion, the extending portion being provided to extend in a first direction, the first direction being a direction in which the first and second cases are coupled to each other, so as to shield a portion at which the first and second cases are coupled to each other.

The first case may include an accommodating portion, the accommodating portion being a space for accommodating the battery module, and a first coupling portion provided at an entrance of the accommodating portion. The second case may include a second coupling portion corresponding to the first coupling portion.

The first coupling portion may have a flange portion that bends toward an outside from the entrance of the accommodating portion.

The second case may include the extending portion. The second coupling portion and the extending portion may be perpendicular to each other. The first coupling portion may correspond to the second coupling member and the extending portion.

The first and second coupling portions may have first and second openings corresponding to each other. The first and second coupling portions may be fastened by separate fastening members through the first and second openings.

The battery pack may further include a sealing member interposed between the first and second coupling portions.

The first and second coupling portions may have first and second openings to corresponding to each other. The sealing member may have third openings corresponding to the first and second openings. The first and second coupling portions and the sealing member may be fastened by separate fastening members through the first to third openings.

The sealing member may include at least one of a gasket material, rubber, silicon, and epoxy.

The battery pack may further include a reinforcing member at an outside of the first or second coupling portion.

The first and second coupling portions may have first and second openings corresponding to each other. The reinforcing member may have fourth openings corresponding to the first and second openings. The first and second coupling portions and the reinforcing member may be fastened by separate fastening members through the first, second, and fourth openings.

The extending portion may extend in the first direction from the second case. The first case may have a receiving portion for accommodating the extending portion in an inside of the first case.

The extending portion may extend in the first direction from a surface of the second coupling portion of the second case. The first case may have a receiving portion for accommodating the extending portion at a position corresponding to the extending portion.

The extending portion may extend in the first direction from the second case so as to overlap with at least one portion of the first case. A length of a portion at which the extending portion and the first case overlap with each other may be greater than a thickness of the first case at the at least one portion of the first case where the extending portion and the first case overlap.

BRIEF DESCRIPTION OF THE DRAWINGS

Features will become apparent to those of skill in the art by describing in detail exemplary embodiments with reference to the attached drawings in which.

DETAILED DESCRIPTION

Korean Patent Application No. 10-2012-0029859, filed on Mar. 23, 2012, in the Korean Intellectual Property Office, and entitled: "Battery Pack" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope thereof to those skilled in the art.

In the drawing figures, the dimensions of layers and regions may be exaggerated for clarity of illustration. Like reference numerals refer to like elements throughout.

Figure 1A:
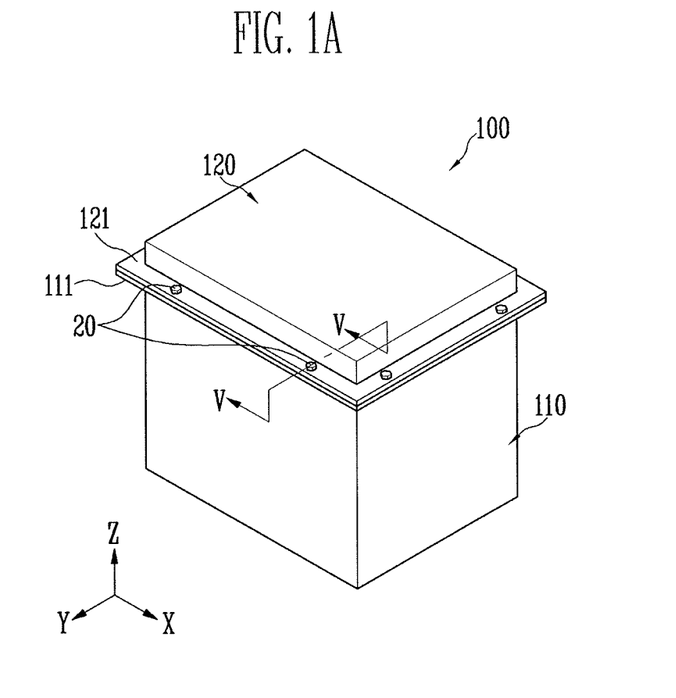
FIG. 1A illustrates a perspective view of a battery pack according to an embodiment.
Figure 1B:
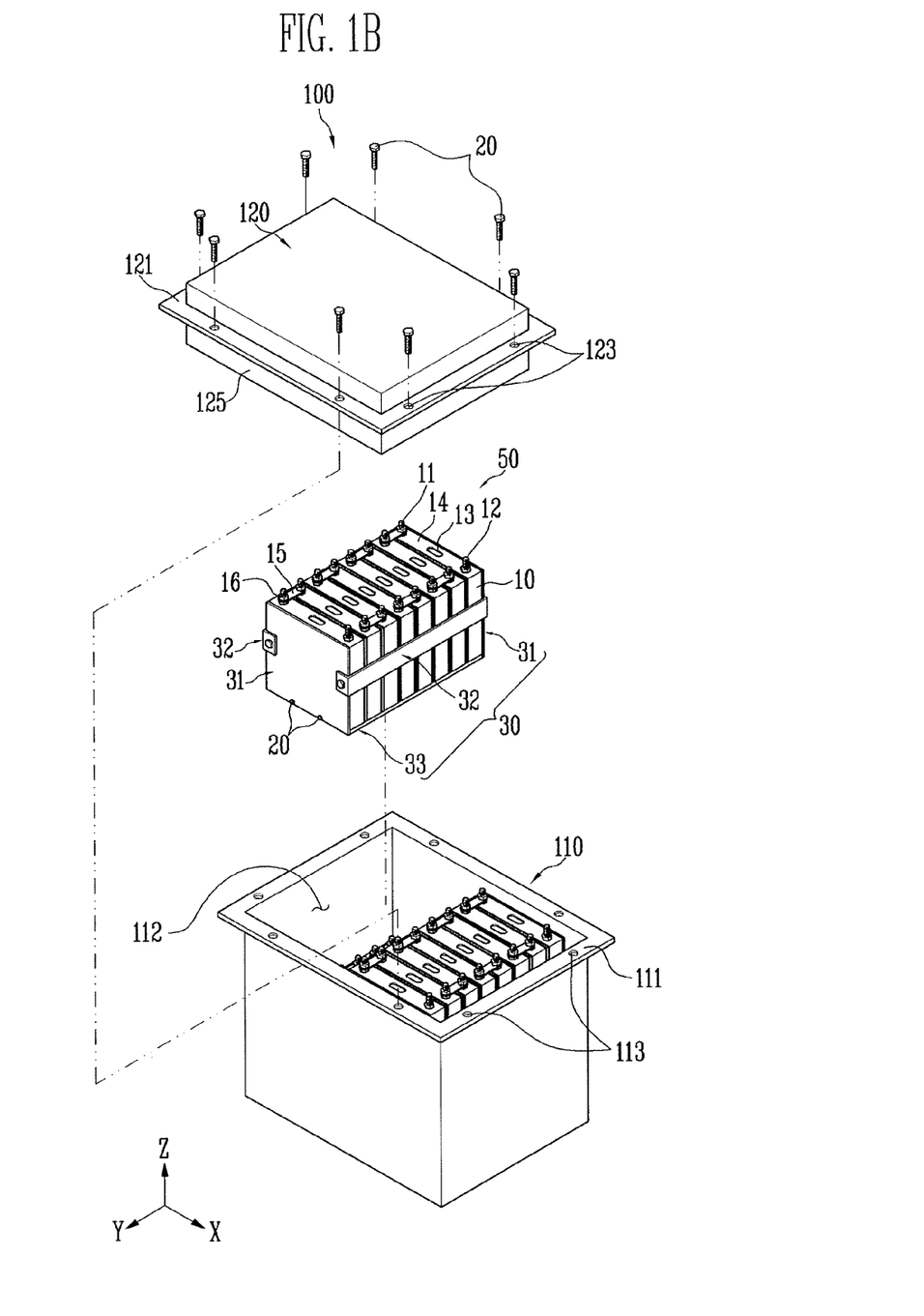
FIG. 1B illustrates an exploded perspective view of FIG. 1A.

FIG. 1A illustrates a perspective view of a battery pack according to an embodiment. FIG. 1B illustrates an exploded perspective view of FIG. 1A.

The battery pack 100 according to this embodiment includes a battery module 50 having a plurality of battery cells 10 electrically connected, a first case 110 accommodating the battery module 50 therein, and a second case 120 provided opposite to the first case 110 so as to be coupled to the first case 110. The first or second case 110 or 120 may be provided with an extending portion 125. The extending portion 125 may be provided to extend in a first direction Z so as to shield a portion at which the first and second cases 110 and 120 are coupled to each other. Here, the first direction Z is a direction in which the first and second cases 110 and 120 are coupled to each other. The first case 110 may include an accommodating portion 112 that is a space accommodating the battery module 50 therein. A first coupling portion 111 may be provided at an entrance of the accommodating portion 112. The second case 120 may include a second coupling portion 121 provided to correspond to the first coupling portion 111.

The battery module 50 may include one or more battery cells 10 and a plurality of plates 30. The battery cells 10 may be electrically connected and may be fixed using the plates 30. Each battery cell 10 may include a battery case having one opened surface, an electrode assembly, and an electrolyte. The electrode assembly and the electrolyte may be accommodated in the battery case so as to generate electrochemical energy. The opened surface of the battery case may be sealed by a cap plate 14.

The cap plate 14 may be provided with a positive electrode terminal 11, a negative electrode terminal 12 and a vent portion 13. The positive and negative electrode terminals 11 and 12 may be electrically connected by a bus-bar 15 so as to be fixed using a nut 16. The positive and negative electrode terminals 11 and 12 may be connected to the electrode assembly accommodated in the inside of the battery case so that the electrochemical energy can be transferred to the outside of the battery cell 10 therethrough. The vent portion 13 may act as a safety device for preventing explosion of the battery cell 10 by allowing gas generated in the inside of the battery cell 10 to be exhausted to the outside through the vent portion 13.

The battery cells 10 may be physically fixed by the plates 30. The plates 30 may include a pair of end plates 31 provided opposite to each other so as to press and fix the battery cells 10 in inside directions of the battery cells 10, side plates 32 connecting the end plates 31 and supporting side surfaces of the battery cells 10, and a bottom plate 33 supporting bottom surfaces of the battery cells 10.

One or more battery modules 50 may be accommodated in the first and second cases 110 and 120 so as to be manufactured as the battery pack 100. The first and second cases 110 and 120 may be provided to correspond to each other, and the accommodating portion 112 may be provided to accommodate the one or more battery modules 50 in at least one of the first and second cases 110 and 120. Although it has been described in this embodiment that the accommodating portion 112 is provided to the first case 110, in other implementations, the accommodating portion 112 may be provided to the second case 120 or may be provided to both the first and second cases 110 and 120.

The first case 110 may include the accommodating portion 112, which is a space accommodating the battery module 50 therein. The first coupling portion 111 may be provided at the entrance of the accommodating portion 112. The second coupling portion 121 of the second case 120 may be provided to correspond to the first coupling portion 111. The one or more battery modules 50 may be accommodated in the accommodating portion 112 of the first case 110. The second case 120 may be mounted on the first case 110 so as to close the entrance of the accommodating portion 112. In this case, the first and second coupling portions 111 and 121 of the first and second cases 110 and 120 may be coupled to each other.

The extending portion 125 may be provided to the second case 120. The extending portion 125 may be provided to extend in the first direction Z so as to seal the portion at which the first and second cases 110 and 120 are coupled to each other. Here, the first direction Z is a direction in which the first and second cases 110 and 120 are coupled with each other.

The first coupling portion 111 may include a flange portion provided that bends toward the outside from the entrance of the accommodating portion 112. The second coupling portion 121 may be provided to correspond to the first coupling portion 111, so that the first and second coupling portions 111 and 112 can be coupled to each other. To avoid having the space between the first and second coupling portions 111 and 121 become a passageway for electromagnetic interference (EMI), moisture or the like, the battery pack 100 according to this embodiment may include the extending portion 125 to shield the space between the first and second coupling portions 111 and 121. The extending portion 125 may be extended toward the outside from the second case 120, and may be extended in the first direction Z that is a direction in which the first and second cases 110 and 120 are coupled to each other. The extending portion 125 may be provided to be connected to the second case 120 along with the second coupling portion 121 from the second case 120.

Generally, in a battery pack, the portion at which a plurality of cases constituting the battery pack are coupled together is a portion at which sealing performance may be weak. Such a portion may become a passageway for EMI or the like. If EMI were to enter a battery pack, the EMI could cause electrical problems with battery cells provided the inside the battery pack, and with a protection device, and the like. If moisture were to enter the battery pack, as well as the EMI, the moisture could cause safety problems by reacting with elements, e.g., lithium, constituting the battery cells. However, if various separate members were to be added to the battery pack in an effort to shield the EMI and moisture, the production cost of the battery pack could increase, and the processing efficiency of the battery pack could be lowered.

In this embodiment, the sealing performance of the battery pack may be improved without adding a separate member to the battery pack. Accordingly, it may be possible to improve a shielding property with respect to EMI and to prevent moisture or the like from entering into the battery pack.

Figure 2:
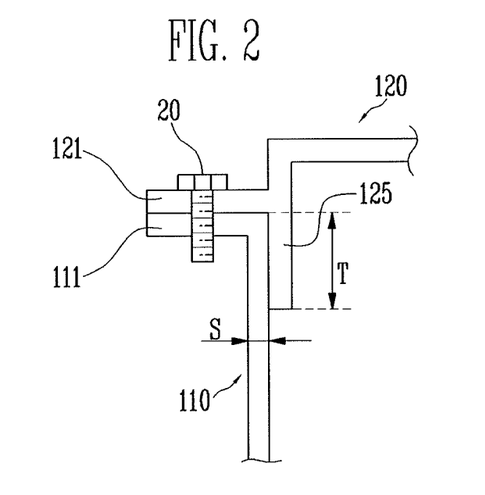
FIG. 2 illustrates a sectional view taken along line V-V of FIG. 1A.

FIG. 2 illustrates a sectional view taken along line V-V of FIG. 1A.

Referring to FIG. 2, the second case 120 is provided with the second coupling portion 121 and the extending portion 125, which may be perpendicular to each other. The first coupling portion 111 of the first case 110 may be provided to correspond to the second coupling portion 121 and the extending portion 125. The extending portion 125 may be provided to the first and second coupling portions 111 and 121, which are portions at which the first and second cases 110 and 120 are coupled to each other. Accordingly, it may be possible to improve the shielding ability of the space between the first and second coupling portions 111 and 121. The first coupling portion 111 may be provided to exactly fit with the extending portion 125 and the second coupling portion 121. Accordingly, the positions of the first and second cases 110 and 120 may be easily aligned when the first and second cases 110 and 120 are assembled.

The extending portion 125 may be extended in the first direction Z from the second case 120 so as to overlap with at least one portion of the first case 110. In this case, the length T of the portion at which the extending portion 125 and the first case 110 are overlapped with each other may be greater than the thickness S of the first case 110 at the overlapped portion. The length T of the portion at which the extending portion 125 and the first case 110 are overlapped with each other may be greater than the thickness S of the first case 110, so that the first and second coupling portions 111 and 121 can be firmly sealed together. (Herein, the term "thickness S of the first case 110" may refer to the thickness of a sidewall of the first case 110 at the overlapped portion.)

The first and second coupling portions 111 and 121 may have respective first and second openings 113 and 123 that correspond to each other. The first and second coupling portions 111 and 121 may be fastened by a separate fastening member 20 through the first and second openings 113 and 123. The first and second openings 113 and 123 may facilitate the coupling between the first and second cases 110 and 120. In addition, when the first and second cases 110 and 120 are coupled to each other, the first and second openings 113 and 123 may facilitate the alignment between the first and second cases 110 and 120, so that it may be possible to prevent an assembling failure of the first and second cases 110 and 120.

Hereinafter, another embodiment will be described with reference to FIGS. 3 to 6. Contents described in this embodiment, except the following contents, may be similar to those described in the embodiment shown in FIGS. 1A to 2, and a detailed description thereof will be not be repeated.

Figure 3:
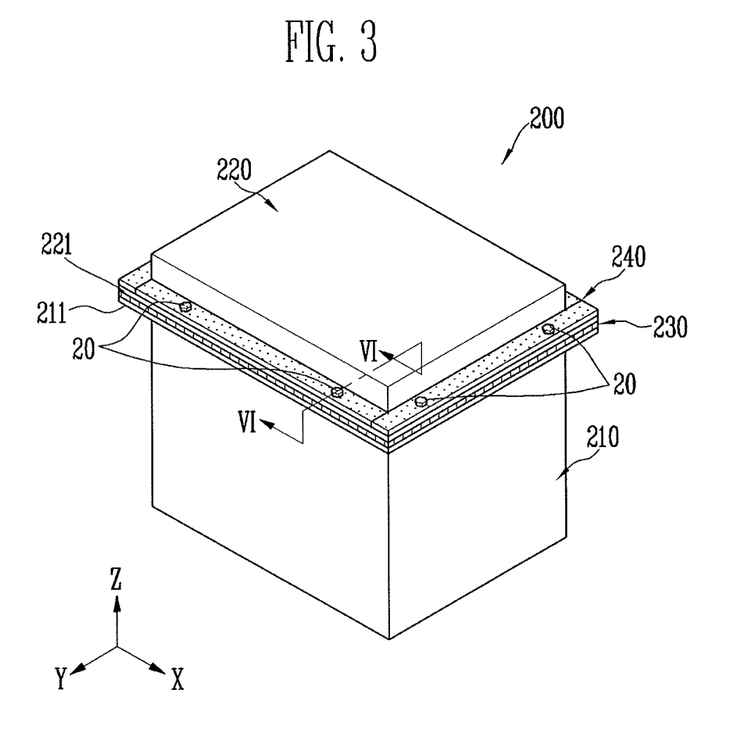
FIG. 3 illustrates a perspective view of a battery pack according to another embodiment.
Figure 4A:
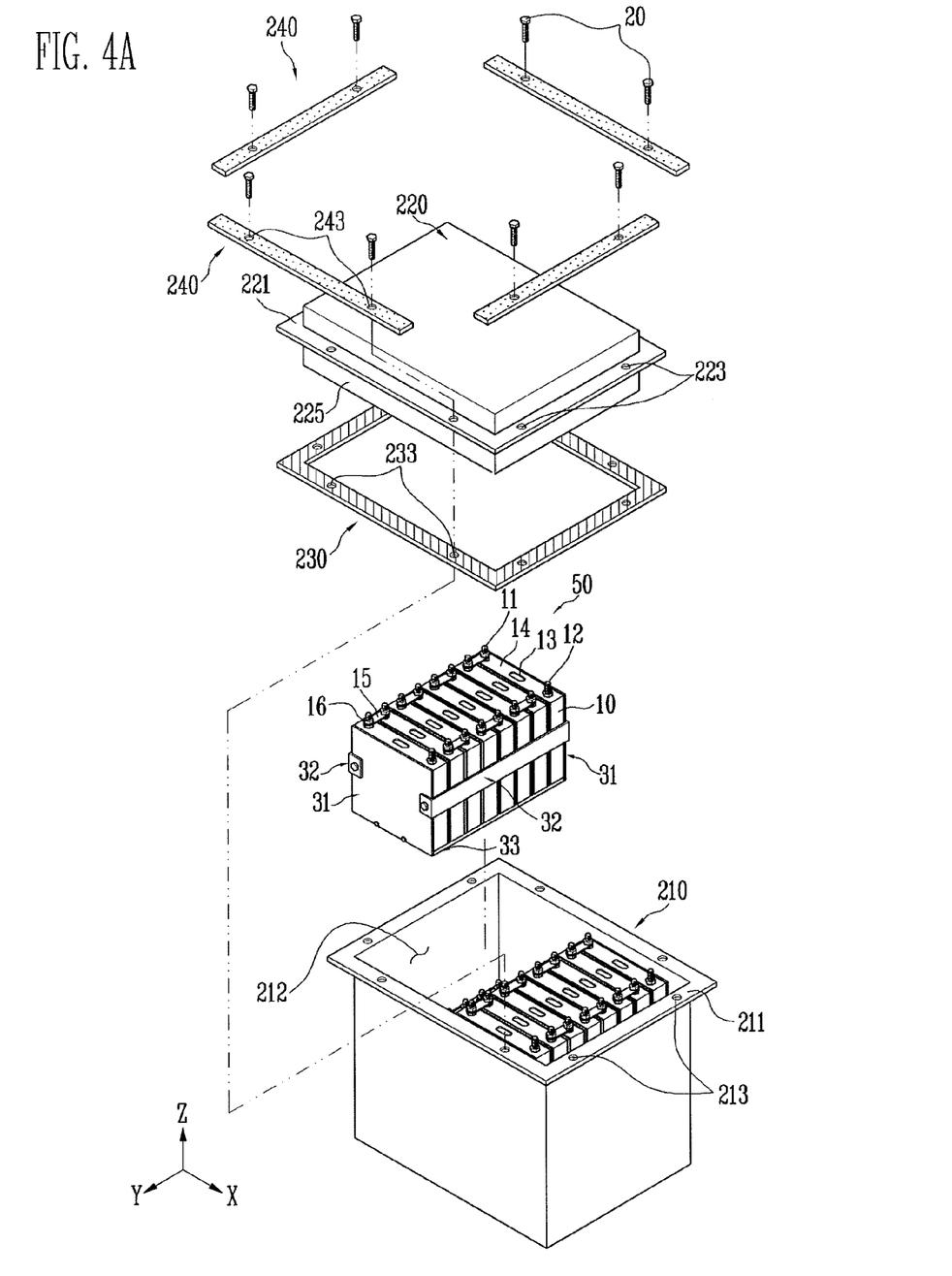
FIG. 4A illustrates an exploded perspective view of FIG. 3.
Figure 4B:
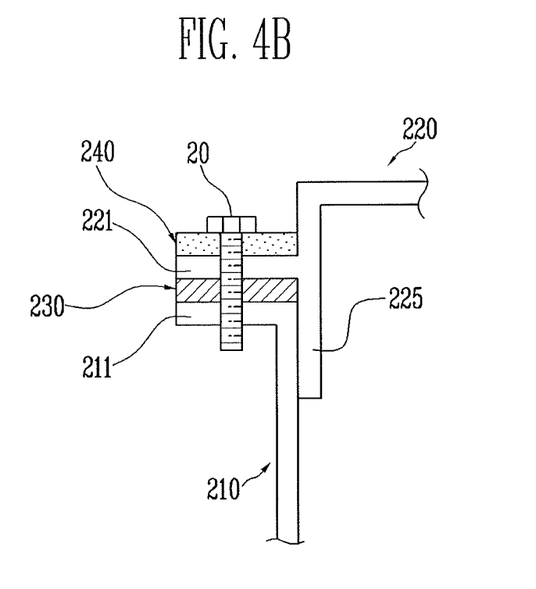
FIG. 4B illustrates a sectional view taken along line VI-VI of FIG. 3.

FIG. 3 illustrates a perspective view of a battery pack according to another embodiment. FIG. 4A illustrates an exploded perspective view of FIG. 3. FIG. 4B illustrates a sectional view taken along line VI-VI of FIG. 3.

Referring to FIGS. 3 to 4B, the battery pack 200 according to this embodiment may include one or more battery modules 50, and first and second cases 210 and 220 accommodating the battery modules 50. In the battery pack 200, the second case 220 may be provided with an extending portion 225. The extending portion 225 may be provided to the second case 220, so as to shield first and second coupling portions 211 and 221, which are portions where the first and second cases 210 and 220 are coupled to each other.

The first and second coupling portions 211 and 221 may have first and second openings 213 and 223, respectively. A sealing member 230 (described below) may have third openings corresponding to the first and second openings 213 and 223. The first and second coupling portions 211 and 221 and the sealing member 230 may be fastened through the first to third openings 213, 223 and 233 by a separate fastening member 20. A reinforcing member 240 (described below) may have fourth openings 243 respectively corresponding to the first and second openings 213 and 223. The first and second coupling portions 211 and 221 and the reinforcing member 240 may be fastened through the first, second and fourth openings 213, 223 and 243 by the separate fastening member 20. In another implementation, the first and second coupling portions 211 and 221, the sealing member, and the reinforcing member 240 may be fastened through the first, second, third, and fourth openings, 213, 223, 233, 243 by the separate fastening member 20.

The battery pack 200 may further include the sealing member 230 interposed between the first and second coupling portions 211 and 221.

The first and second cases 210 and 220 may be made of a high-strength material such as stainless steel or aluminum so as to protect the battery module. However, the moldability of these materials may be poor. Therefore, the formed first and second cases could be incompletely coupled if a prominence were to exist at a portion at which the first and second cases 210 and 230 are coupled to each other.

In the battery pack 200 according to this embodiment, the sealing member 230 may be interposed between the first and second coupling portions 211 and 221 where the first and second cases 210 and 220 contact each other. The sealing member 230 may be formed of an elastic material, so that it may be possible to improve the sealing performance between the first and second coupling portions 211 and 221. Thus, the sealing member 230 may prevent moisture from coming into the battery pack 200. The sealing member 230 may include at least one of a gasket material, rubber, silicone and epoxy, as examples.

The battery pack 200 according to this embodiment may further include a reinforcing member 240 at the outside of the first or second coupling portion 211 or 221. The reinforcing member 240 may be formed of a material having a predetermined strength. The first and second openings 213 and 223 may be provided to the respective first and second coupling portions 211 and 221 so that the first and second coupling portions 211 and 221 are coupled to each other. In this case, the strength of the first and second coupling portions 211 and 221 could be degraded due to the presence of the first and second openings 213 and 223. Therefore, if an excessive force were applied to the first and second coupling portions 211 and 221, portions of the first and second coupling portions 211 and 221 could be damaged, or the cohesion between the first and second cases 210 and 220 could be lowered. In the battery pack 200 according to this embodiment, the reinforcing member 240 may reinforce the strength of the first and second coupling portions 211 and 221, so that it may be possible to prevent the first and second coupling portions 211 and 221 from being damaged.

Figure 5:
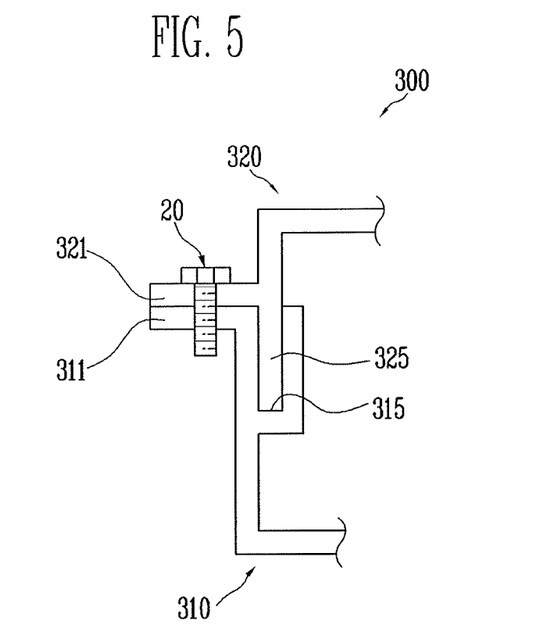
FIG. 5 illustrates a sectional view showing first and second coupling portions in a battery pack according to still another embodiment.

FIG. 5 is a sectional view showing first and second coupling portions in a battery pack according to still another embodiment.

Referring to FIG. 5, the battery pack 300 according to this embodiment includes one or more battery modules and first and second cases 310 and 320. A receiving portion 315 and an extending portion 325 may be respectively provided to the first and second coupling portions 311 and 321 where the first and second cases 310 and 320 are coupled to each other. The second case 320 may include the extending portion 325 protruding to the outside thereof so as to extend in the first direction Z, which is a direction in which the first and second cases 310 and 320 are coupled to each other. The first case 310 may have the receiving portion 315 accommodating the extending portion 325 in the inside of the first case 310.

The extending portion 325 and the receiving portion 315 may be respectively provided to the first and second coupling portions 311 and 321 where the first and second cases 310 and 320 are coupled to each other, so that the first and second cases 310 and 320 can be firmly coupled together. The extending portion 325 may be provided to correspond to the receiving portion 315, so that the extending portion 325 may be forcibly inserted into the receiving portion 315. Thus, it may be possible to improve the cohesion between the first and second cases 310 and 320 and to improve the production efficiency and assembling property of the battery pack 300.

Figure 6:
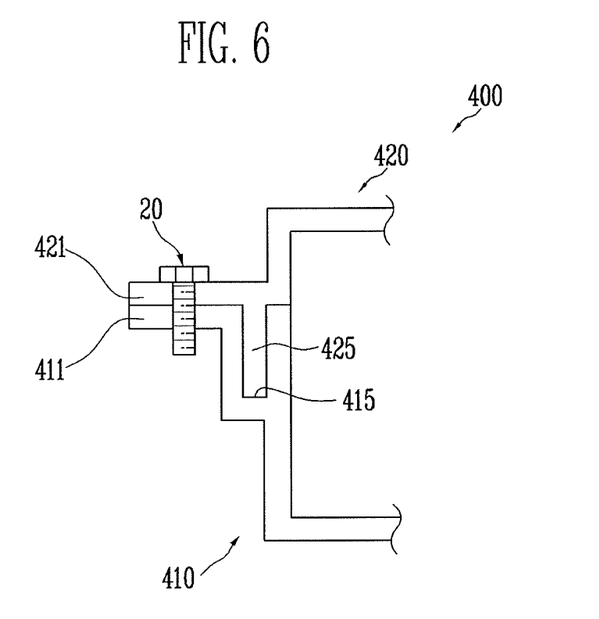
FIG. 6 illustrates a sectional view showing first and second coupling portions in a battery pack according to still another embodiment.

FIG. 6 is a sectional view showing first and second coupling portions in a battery pack according to still another embodiment.

Referring to FIG. 6, first and second cases 410 and 420 of the battery pack 400 respectively include first and second coupling portions 411 and 421 where the first and second cases 410 and 420 are coupled to each other. A receiving portion 415 and an extending portion 425 may be provided to the first and second coupling portions 411 and 421, respectively.

The second case 420 may have the extending portion 425 extended from a surface of the second coupling portion 421 in the first direction Z, which is a direction in which the first and second cases 410 and 420 are coupled to each other. The first case 410 may have the receiving portion 415 accommodating the extending portion 425 at a position corresponding to the extending portion 425. The extending portion 425 and the receiving portion 415 may be provided to correspond to each other, so that the extending portion 425 can be inserted into the receiving portion 415. The extending portion 425 and the receiving portion 415 may be provided between the first and second coupling portions 411 and 421, so that it may be possible to improve the availability of space for the battery pack 400.

By way of summation and review, a battery pack may be manufactured by accommodating a plurality of battery modules together with a protective device in a housing. The battery pack may be used as a power source of a large-sized electronic device such as an automobile or e-bike. In this case, it is desirable to secure the economical efficiency and safety of the battery pack.

Embodiments disclosed herein may provide a battery pack with a housing that provides a battery pack with improved sealing and shielding properties.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A battery pack, comprising:
a battery module including a plurality of battery cells that are electrically connected;
a first case including an accommodating portion accommodating the battery module, the accommodating portion including a bottom portion and an integral side portion and forming an enclosed space that is open at one end; and
a second case opposite to the first case so as to be coupled to and cover the one end of the first case, the second case including an extending portion, the extending portion extending in a first direction in overlapping engagement with a surface of the first case at the integral side portion of the accommodating portion thereof, such that an outward-facing surface of the extending portion overlaps and directly contacts an inward-facing surface of the integral side portion of the accommodating portion, wherein a length of a portion at which the extending portion and the first case contact and overlap with each other in the first direction is greater than a thickness of the first case at the portion of the first case where the extending portion and the inward-facing surface of the integral side portion of the accommodating portion overlap, the first direction being a direction in which the first and second cases are coupled to each other, so as to shield a portion at which the first and second cases are coupled to each other and wherein a portion of the integral side portion that is not overlapping with the extending portion is exposed to an interior of the enclosed space.

2. The battery pack as claimed in claim 1, wherein:
the first case includes a first coupling portion provided at an entrance of the accommodating portion, and
the second case includes a second coupling portion corresponding to the first coupling portion.

3. The battery pack as claimed in claim 2, wherein the first coupling portion has a flange portion that bends toward an outside from the one end of the accommodating portion.

4. The battery pack as claimed in claim 2, wherein:
the second coupling portion and the extending portion are perpendicular to each other, and
the first coupling portion corresponds to the second coupling member and the extending portion.

5. The battery pack as claimed in claim 2, wherein:
the first and second coupling portions have first and second openings corresponding to each other, and
the first and second coupling portions are fastened by separate fastening members through the first and second openings.

6. The battery pack as claimed in claim 2, further comprising a sealing member interposed between the first and second coupling portions.

7. The battery pack as claimed in claim 6, wherein:
the first and second coupling portions have first and second openings to corresponding to each other,
the sealing member has third openings corresponding to the first and second openings, and
the first and second coupling portions and the sealing member are fastened by separate fastening members through the first to third openings.

8. The battery pack as claimed in claim 6, wherein the sealing member includes at least one of a gasket material, rubber, silicone, and epoxy.

9. The battery pack as claimed in claim 2, further comprising a reinforcing member at an outside of the first or second coupling portion.

10. The battery pack as claimed in claim 9, wherein
the first and second coupling portions have first and second openings corresponding to each other,
the reinforcing member has fourth openings corresponding to the first and second openings, and
the first and second coupling portions and the reinforcing member are fastened by separate fastening members through the first, second, and fourth openings.

11. The battery pack as claimed in claim 2, wherein:
the first case has a receiving portion for accommodating the extending portion in an inside of the first case.

12. The battery pack as claimed in claim 2, wherein:
the extending portion extends in the first direction from a surface of the second coupling portion of the second case, and
the first case has a receiving portion for accommodating the extending portion at a position corresponding to the extending portion.

* * * * *